(12) United States Patent
Markovic et al.

(10) Patent No.: US 11,897,213 B2
(45) Date of Patent: Feb. 13, 2024

(54) REPLICATING OPTICAL ELEMENTS ONTO A SUBSTRATE

(71) Applicant: ams Sensors Singapore Pte. Ltd., Singapore (SG)

(72) Inventors: Uros Markovic, Zurich (CH); Nicola Spring, Ziegelbrücke (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 108 days.

(21) Appl. No.: 17/608,652

(22) PCT Filed: Jun. 12, 2020

(86) PCT No.: PCT/SG2020/050328
§ 371 (c)(1),
(2) Date: Nov. 3, 2021

(87) PCT Pub. No.: WO2020/256635
PCT Pub. Date: Dec. 24, 2020

(65) Prior Publication Data
US 2022/0227080 A1 Jul. 21, 2022

Related U.S. Application Data

(60) Provisional application No. 62/863,454, filed on Jun. 19, 2019.

(51) Int. Cl.
*B29D 11/00* (2006.01)
*G02B 3/00* (2006.01)
(52) U.S. Cl.
CPC ...... *B29D 11/00375* (2013.01); *G02B 3/0031* (2013.01); *G02B 3/0056* (2013.01)
(58) Field of Classification Search
CPC ............ B29D 11/00375; G02B 3/0031; G02B 3/0056
See application file for complete search history.

(56) References Cited

U.S. PATENT DOCUMENTS

| 2009/0027777 | A1 | 1/2009 | Kyoya | |
| 2012/0202154 | A1* | 8/2012 | Shimada | G02B 3/0068 977/773 |
| 2015/0053341 | A1* | 2/2015 | Chen-Ho | C09J 7/25 428/41.8 |

FOREIGN PATENT DOCUMENTS

| WO | 2009076787 A1 | 6/2009 |
| WO | 2011040626 A1 | 4/2011 |
| WO | 2012162053 A3 | 11/2012 |

OTHER PUBLICATIONS

International Search Report for corresponding International Application No. PCT/SG2020/050328, dated Sep. 8, 2020.

* cited by examiner

*Primary Examiner* — Mathieu D Vargot
(74) *Attorney, Agent, or Firm* — Michael Best & Friedrich LLP (57) ABSTRACT

Techniques for controlling the flow of replication material (e.g., epoxy) during the formation of replicated optical elements include providing a transparent substrate (220) onto which the optical elements are to be replicated. The substrate (220) includes a structured UV curable shield (202) adhering to its surface. The UV curable shield (202), in turn, has openings (203) that expose portions of the surface of the transparent substrate (220) for replication of the optical elements. During the replication process, excess replication material (124A) may flow onto the UV curable shield (202), which subsequently can be cured so as to facilitate the release and removal of the shield (202) along with the excess replication material (124A).

16 Claims, 6 Drawing Sheets

REPLICATING OPTICAL ELEMENTS ONTO A SUBSTRATE

TECHNICAL FIELD

This disclosure relates to replicating optical elements.

BACKGROUND

Optical devices that include one or more optical light emitters and one or more optical sensors can be used in a wide range of applications including, for example, distance measurement, proximity sensing, gesture sensing, and imaging. Small optoelectronic modules such as imaging devices and light projectors employ optical assemblies that include lenses or other optical elements stacked along the device's optical axis to achieve desired optical performance. Replicated optical elements include transparent diffractive and/or refractive optical elements for influencing an optical beam. In some applications, such optoelectronic modules can be integrated into various consumer electronics, such as portable computing devices (e.g., smart phones, tablets, wearables, and laptop computers).

SUMMARY

The present disclosure describes techniques for controlling the flow of replication material (e.g., epoxy) during the formation of replicated optical elements. The techniques involve providing a transparent (e.g., glass) substrate onto which the optical elements are to be replicated. The substrate includes a structured UV curable shield adhering to its surface. The UV curable shield, in turn, has openings that expose portions of the surface of the transparent substrate for replication of the optical elements. During the replication process, excess replication material may flow onto the UV curable shield, which subsequently can be cured so as to facilitate the release and removal of the shield along with the excess replication material.

In various implementations, the replication tool includes spacers to facilitate the process.

For example, in one aspect, the present disclosure describes a method that includes providing a transparent substrate having a structured UV curable shield adhering to its surface. The UV curable shield has openings that expose portions of the surface of the transparent substrate. The method further includes replicating optical elements onto the exposed portions of the surface of the transparent substrate using a replication tool having a replication material on respective replication surfaces corresponding to optical elements. The replication tool further includes spacers each of which laterally surrounds a respective one of the replication surfaces, and wherein, during the replicating, a free-end of each spacer is brought into close proximity to an opposing surface of the UV curable shield. UV radiation is applied to the replication material and to the UV curable shield, and subsequently the shield is removed from the transparent substrate.

Some implementations include one or more of the following features. For example, in some instances, the UV curable shield is composed of a dicing tape. Applying the UV radiation can release the shield from the transparent substrate. In some implementations, during the replicating, excess replication material flows onto the UV curable shield, and removing the shield also removes the excess replication material. In some cases, during the replicating, the free-ends of at least some of the spacers are brought into contact with the opposing surface of the UV curable shield. In some instances, during the replicating, when the free-ends of the spacers are brought into close proximity to the opposing surface of the UV curable shield, a sub-micron thick layer of the replication material is present between at least some of the free-ends of the spacers and the opposing surface of the UV curable shield. The transparent substrate can be composed, for example, of glass.

In accordance with another aspect, the present disclosure describes a method that includes providing a transparent substrate having a structured UV curable shield adhering to its surface. The UV curable shield has openings that expose portions of the surface of the transparent substrate. The method further includes replicating optical elements onto the exposed portions of the surface of the transparent substrate using a replication tool having a replication material on respective replication surfaces corresponding to optical elements. The replication tool further includes spacers each of which laterally surrounds a respective one of the replication surfaces, and during the replicating, a free-end of each spacer is brought into close proximity to a respective one of the exposed portions of the surface of the transparent substrate. UV radiation is applied to the replication material and to the UV curable shield, and subsequently the shield is removed from the transparent substrate.

Some implementations include one or more of the following features. For example, in some instances, the UV curable shield is composed of a dicing tape. Applying the UV radiation can release the shield from the transparent substrate. In some instances, during the replicating, excess replication material flows onto the UV curable shield, and removing the shield also removes the excess replication material. In some cases, during the replicating, the free-ends of at least some of the spacers are brought into contact with the respective one of the exposed portions of the transparent substrate. In some implementations, during the replicating, when the free-ends of the spacers are brought into close proximity to a respective one of the exposed portions of the transparent substrate, a sub-micron thick layer of the replication material is present between at least some of the free-ends of the spacers and the respective one of the exposed portions of the transparent substrate. The transparent substrate can be composed, for example, of glass.

According to yet a further aspect, the present disclosure describes a method that includes providing a transparent substrate having a structured UV curable shield adhering to its surface. The UV curable shield has first and second openings that expose portions of the surface of the transparent substrate, wherein respective groups of the second openings laterally encircle respective ones of the first openings. The method includes replicating optical elements onto the exposed portions of the surface of the transparent substrate defined by the first openings. The replicating is performed using a replication tool having a replication material on respective replication surfaces corresponding to optical elements, wherein the replication tool further includes a plurality of spacers, wherein respective groups of the spacers laterally encircle respective ones of the replication surfaces. During the replicating, a free-end of each spacer is brought into contact with a respective one of the exposed portions of the surface of the transparent substrate defined by the second openings. UV radiation is applied to the replication material and to the UV curable shield, and subsequently the shield is removed from the transparent substrate.

Some implementations include one or more of the following features. For example, in some instances, the UV curable shield is composed of a dicing tape. Applying the UV radiation can release the shield from the transparent substrate. In some cases, during the replicating, excess replication material flows onto the UV curable shield, and removing the shield also removes the excess replication material. The transparent substrate can be composed, for example, of glass.

Some implementations provide one or of the following advantages. For example, in some cases, the techniques help control the flow of replication material over the surface of the substrate. Controlling the flow of the replication material can, in some instances, help reduce the overall footprint of each optical element, which in turn can help reduce the size of the package or module into which the optical element is integrated.

Other aspects, features, advantages will be apparent from the detailed description, the accompanying drawings, and the claims.

DETAILED DESCRIPTION

Figure 1:
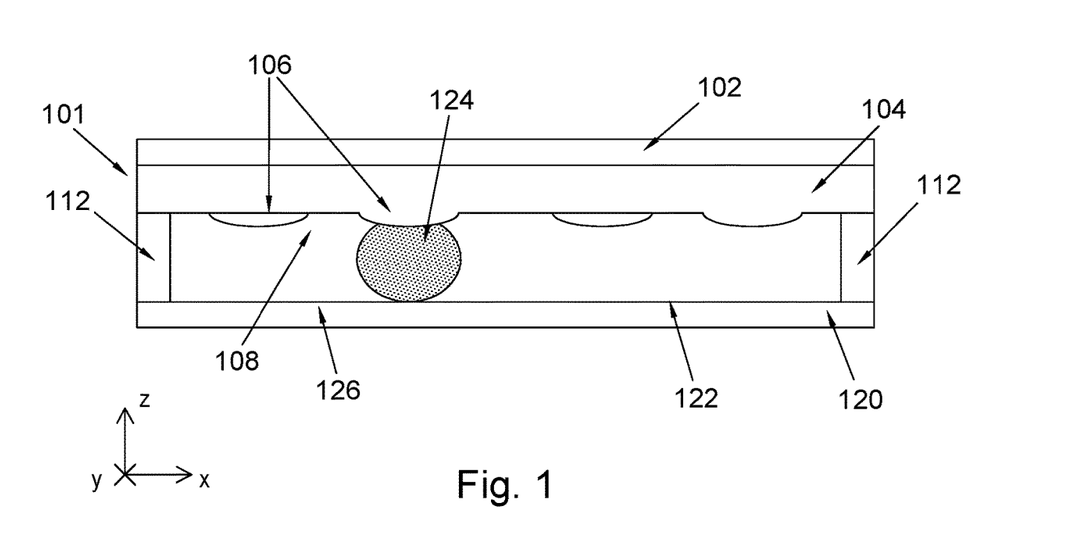
FIG. 1 illustrates a cross-sectional view of a tool-substrate structure for replication.

FIG. 1 schematically shows a cross section of a typical replication tool 101, and a transparent substrate 120 onto which optical elements are to be formed by replication. The tool 101 includes a rigid or relatively hard back plate 102 composed of a first material, for example glass, and a replication portion 104 composed of a second, softer material, for example polydimethylsiloxane (PDMS). The relatively low stiffness of the replication portion 104 can allow the replication portion, under "normal" conditions (e.g., where no more pressure than the one caused by gravity forces of the tool lying on the substrate or vice-versa), to adapt to roughness, e.g., on a micrometer and/or sub-micrometer scale and, thus, may form an intimate connection to the substrate surface when they are brought into contact with one another.

The replication portion 104 forms a replication surface 108 including replication sections 106, the surface of each of which is a (negative) copy of a surface shape an optical element to be manufactured by replication. The optical elements to be manufactured by replication may be, for example, lenses, diffusers, or other optical elements. In some instances, each optical element to be replicated is a micro-lens array (MLA). In some cases, the replication sections 106 can be, for example, convex and thus define a concave optical element surface, or can be convex and define a concave optical element surface.

The replication portion 104 has contact spacer portions 112 arranged peripherally. The contact spacer portions 112 are the structures of the replication tool 101 that protrude the furthest from the tool 101 along the z axis. The contact spacer portions 112 are essentially flat and, thus, are operable to rest against the substrate 120 during replication, with no material between the contact spacer portions 112 and the substrate 120. The contact spacer portions 112 may, for example, form a ring laterally surrounding the periphery of the replication surface 108, or may form discrete portions around the periphery.

The substrate 120 has a first side (e.g., substrate surface 126) and a second side and can be composed of any suitable material, for example glass. The substrate surface 126 may have a structure to which the replica is to be aligned. The structure may, for example, comprise a coating 122 structured in the x-y-plane, such as a screen with apertures, or a structured IR filter etc. The structure may in addition, or as an alternative, comprise further features like markings.

For replicating the replication surface 108 of the tool 101, replication material 124 is applied to the substrate 120 or the tool 101 or both the tool 101 and the substrate 120. Although a single portion of replication material 124 is illustrated in the figure, application of the replication material 124 may include applying multiple portions of replication material 124 (e.g., a respective portion for each of the replication sections 106). Each portion may, for example, be applied by dispensing (e.g., jetting) one or more droplets using a dispensing tool. The replication material 124 can be composed, for example, of epoxy.

After application of the replication material 124, the substrate 120 and the tool 101 are aligned with respect to one another, for example, at an alignment station. Subsequent to the alignment, the substrate 120 and the tool 101 are brought together, with the contact spacer portions 112 resting against the substrate surface so as to define the height in the z dimension and also to lock the tool against x-y-movements. After the replication tool 101 and the substrate 120 have been moved towards each other with the replication material 124 between them, the substrate-tool-assembly can be removed from the alignment station and transferred to a hardening station, where the replication material 124 is hardened (e.g., cured). The replication tool 101 then can be removed.

Figure 2:
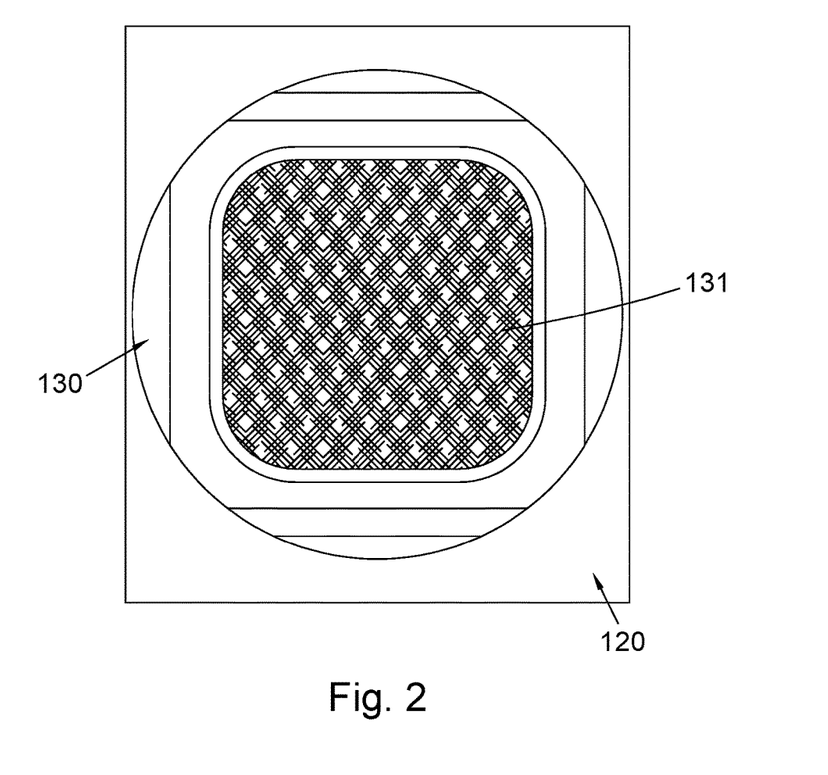
FIG. 2 shows a replicated optical element having an excess epoxy or "yard" portion.

Referring to FIG. 2, during replication, excess replication material (e.g., epoxy) applied, for example, during jetting normally overflows the region of interest and forms a "yard" 130 when the tool and the substrate 120 are brought into contact. The yard 130 sometimes is annular or ring shaped and laterally surrounds the active region of the optical element 131. The yard 130 results from more epoxy 124 being added during the replication process than each replicated structure (e.g., optical element) requires, causing an overflow. The additional epoxy ensures that the complete volume of replication material needed for a particular structure is available (as the tolerance of the epoxy volume is not zero), and the extra fluid pools to form the yard 130.

The transparent substrate having the replicated optical elements on its surface then can be separated into individual units each of which includes a single one of the replicated optical elements (e.g., MLAs). The replicated optical elements then can be positioned (e.g., by pick-and-place equipment), for example, over a light emitter such as a VCSEL, an LED or laser diode as part of an optoelectronic package that subsequently may be assembled into a small portable computing device such as a smartphone. Space in such devices, however, is often at a premium. Thus, it is desirable in many instances to reduce the footprint or area covered by the optoelectronic package, which in turn can impose tight requirements on the maximum dimensions of the optical element unit. Thus, it is desirable to reduce the footprint of the optical element unit.

FIGS. 3A through 7B illustrate a first process for fabricating replicated optical elements, which can result in the optical elements having a reduced overall footprint even though the active region of the optical element has substantially the same dimensions as the optical elements resulting from the process of FIGS. 1-2. The replicated optical elements can be fabricated in a wafer-level process in which tens, hundreds or even more optical elements are fabricated in parallel.

Figure 3A:
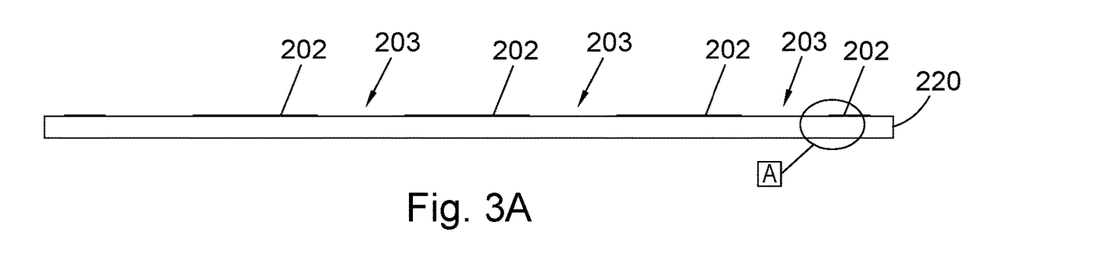
FIGS. 3A, 4, 5A, 6 and 7A show a sequence of steps in a first process for fabricating replicated optical elements.
Figure 3B:
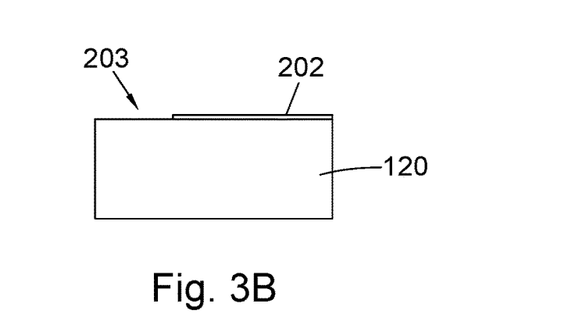
FIG. 3B is an enlarged view of section A of FIG. 3A.

As shown in FIGS. 3A and 3B, a thin, structured, ultraviolet (UV) curable shield 202 is provided on a surface of a transparent (e.g., glass) substrate 220. Prior to placing the UV curable shield 202 on the substrate 220, the surface of the substrate can be prepared, for example, by plasma activation, which can help improve adherence of the UV curable shield 202 to the substrate. The UV curable shield 202 can be, for example, dicing tape that is structured, e.g., by forming openings 203 in the dicing tape using water jetting. In some instances, the UV curable shield is placed on the substrate 220 using a mask aligner. The openings 203 in the UV curable shield 202 correspond to locations on the substrate 220 where the replicated optical elements are to be formed. In some instances, dicing tape having a thickness of about 75 μm can be used. The dicing tape can by a one-sided adhesive tape in which the side having the adhesive faces the transparent substrate 220.

Figure 4:
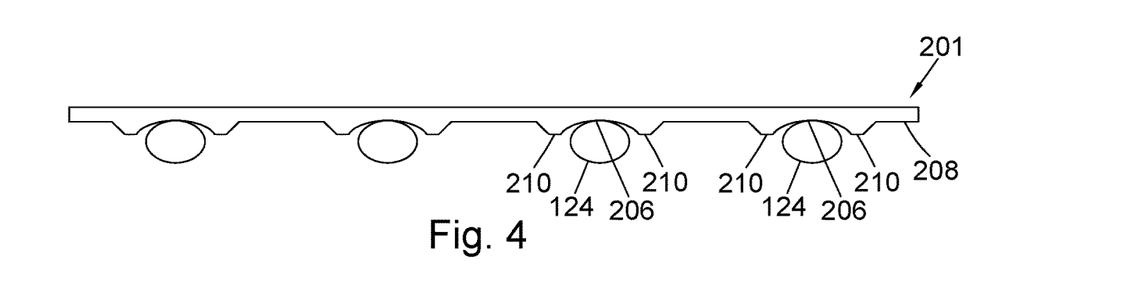

Next, as illustrated in FIG. 4, replication material (e.g., a polymer such as an epoxy) is provided (e.g., by jetting) on the replication surface 208 of a replication tool 201. As described above, the tool 201 can include a rigid or relatively hard back plate composed of a first material, for example glass, and a replication portion composed of a second, softer material, for example PDMS. The replication material 124 is provided on optical element replication regions 206 of the replication surface 208. The optical element replication regions 206 define the (inverse) of the optical elements to be replicated onto the surface of the substrate 220. In this implementation, however, the replication portion of the tool 201 also has spacers 210, each of which laterally surrounds a respective one of the optical element replication regions 206. The spacers 210 extend beyond areas of the replication surface 208 that define the optical element replication regions 206.

After application of the replication material 124, the substrate 220 and the tool 201 are aligned with respect to one another, for example, at an alignment station. Subsequent to the alignment, the substrate 220 and the tool 201 are brought together (see FIGS. 5A and 5B). As described in connection with FIG. 1, the tool 201 may have contact spacer portions at its outer periphery that rest against the substrate surface so as to define the height in the z dimension and also to lock the tool against x-y-movements. In addition, however, the spacers 210 that laterally surround individual ones of the optical element replication regions 206 are designed so that, when the tool 201 is brought into contact with the substrate 220, the free-end of each spacer 210 contacts the opposing surface of the UV curable shield 202 (see FIGS. 5A and 5B). As the tool 201 is brought into contact with the substrate 220, excess replication material 124A is squeezed out of the regions defining the replicated optical elements. As a result, the excess replication material 124A is disposed on the UV curable shield 202. In some cases, a very thin (e.g., submicron) layer of replication material 124 may remain between the free-end of the spacer 210 and the opposing surface of the UV curable shield 202.

Figure 5A:
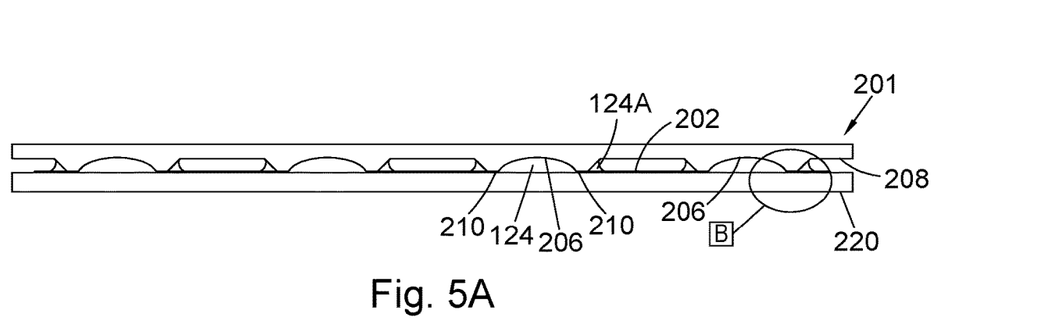
Figure 5B:
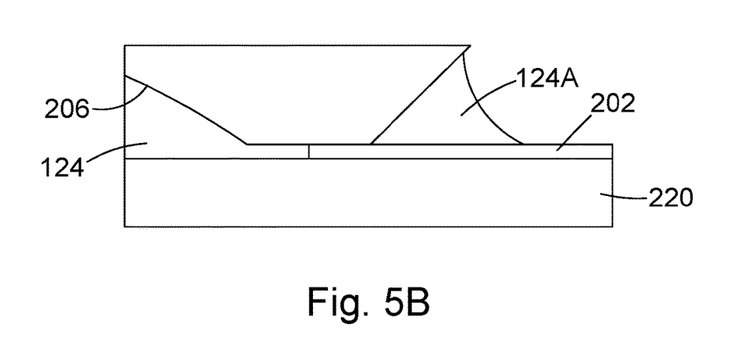
FIG. 5B is an enlarged view of section B of FIG. 5A.

After the optical elements are replicated on the transparent substrate 220 as described above, the substrate-tool-assembly can be transferred to a hardening station, where a UV curing process is applied. The UV curing process cures the replication material 124 (including the excess replication material 124A) and also releases the UV curable shield 202 so that it can be detached from the substrate 220 in a subsequent operation.

Figure 6:
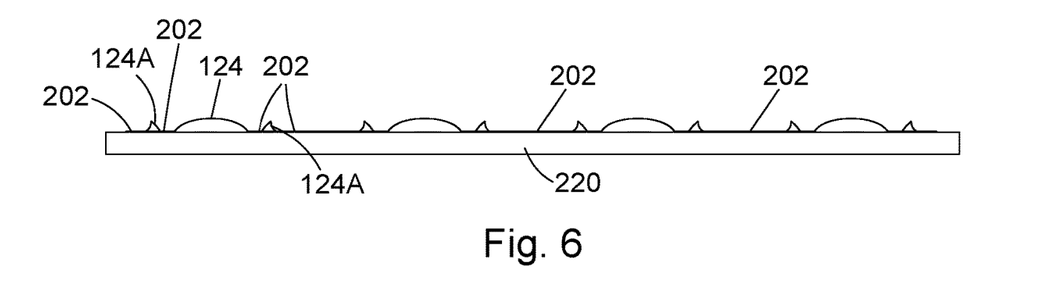
Figure 7A:
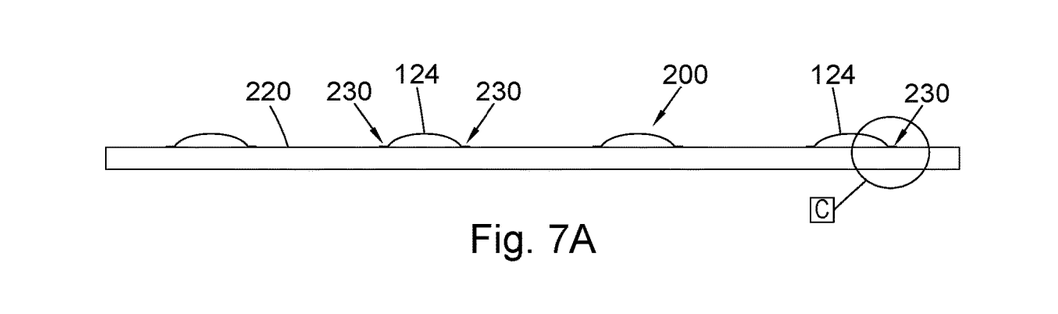
Figure 7B:
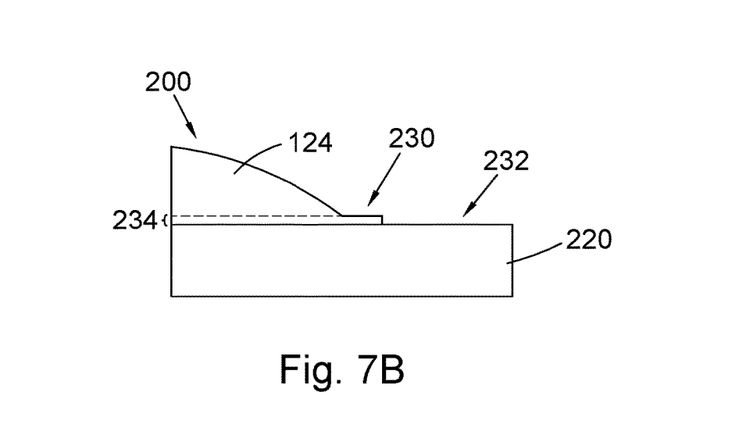
FIG. 7B is an enlarged view of section C of FIG. 7A.

The replication tool 201 then can be removed. The resulting structure is illustrated in FIG. 6, which shows the cured replication material 124 for the optical elements disposed directly on the transparent substrate 220, and also shows the cured excess replication material 124A disposed on the cured shield 202. Next, as illustrated by FIG. 7, the shield 202 (which has been released as a result of the UV curing), can be removed manually from the transparent substrate 220. As the developed layer of replication material between the shield 202 and the free-ends of the spacers 210 is very thin, a clean stress break along the edges of the shield 202 can be made, resulting in optical elements (e.g., lenses) with only a very small "yard" 230 and a relatively clean glass surface 232 where the shield 202 previously was present.

Figure 8A:
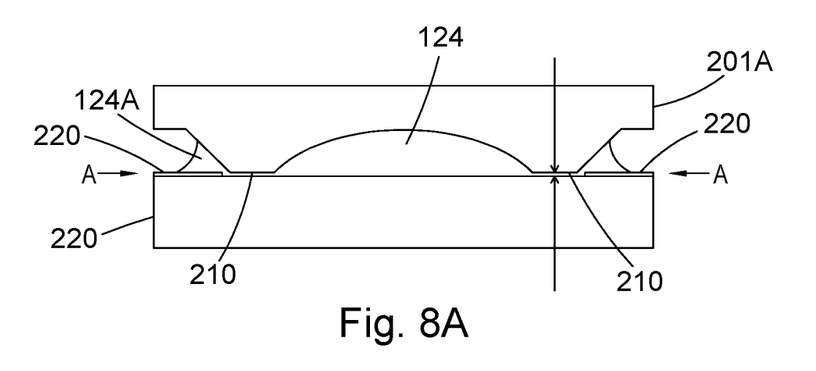
FIG. 8A illustrates a second implementation.
Figure 8B:
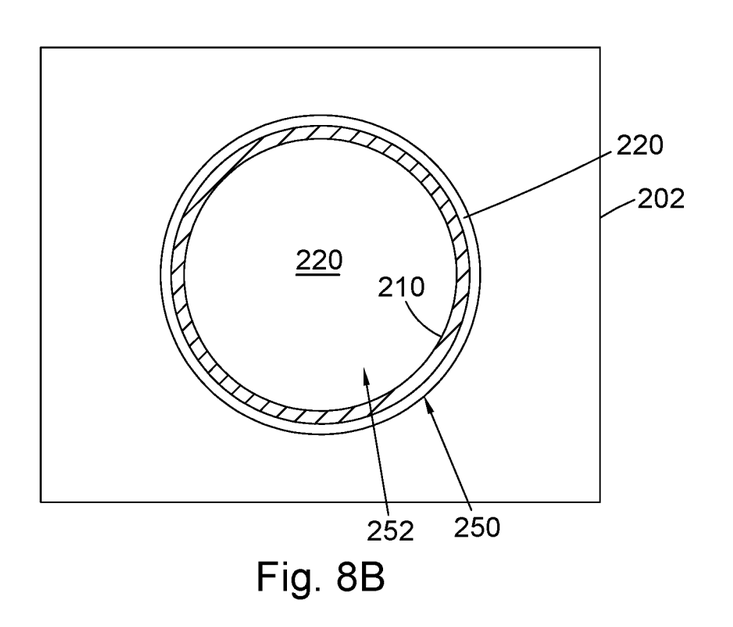
FIG. 8B is a top view of a slice through A-A in FIG. 8A.

In the foregoing example, the thickness of the shield 202 impacts the thickness of the base layer 234 of the replicated optical element 200 because the spacers 210 rest on opposing surface of the shield 202 during the replication process. Variations in the thickness of the shield 202 from process to process can result in variations in the thickness of the base layers of the replicated optical elements. To reduce such variations, which may impact optical performance of the replicated optical elements, the process can be modified so that the free-ends of the spacers 210 lie on the transparent substrate 220 (rather than on the UV curable shield 202), while most of the excess replication material 124A still is on the UV curable shield 202. For example, the openings in the UV curable shield can be made slightly larger than the diameter of the optical element's base so as to accommodate room for the spacer 210. FIGS. 8A and 8B illustrate an example in which an opening 250 in the UV curable shield 202 is large enough to accommodate an area 252 for the replicated optical element as well as an area for the spacer 210 of the tool 201A. As before, application of the UV radiation cures the replication material 124 (including the excess material 124A) and also releases the shield 202. The shield 202 then can be removed manually from the transparent substrate 220, resulting in optical element (e.g., a lens) with only a very small "yard" and a relatively clean glass surface where the shield 202 previously was present.

Figure 9A:
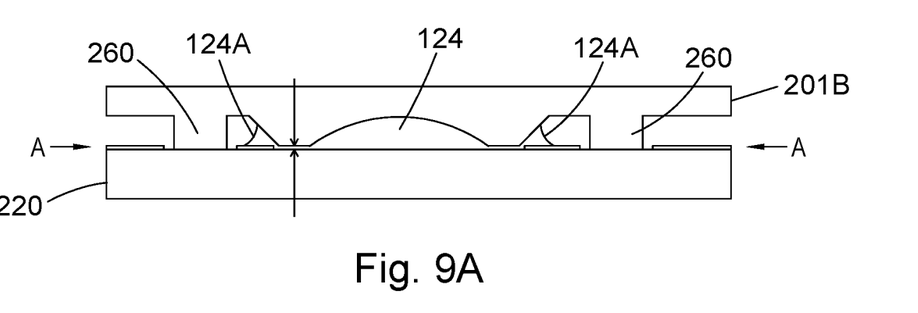
FIG. 9A illustrates a third implementation.
Figure 9B:
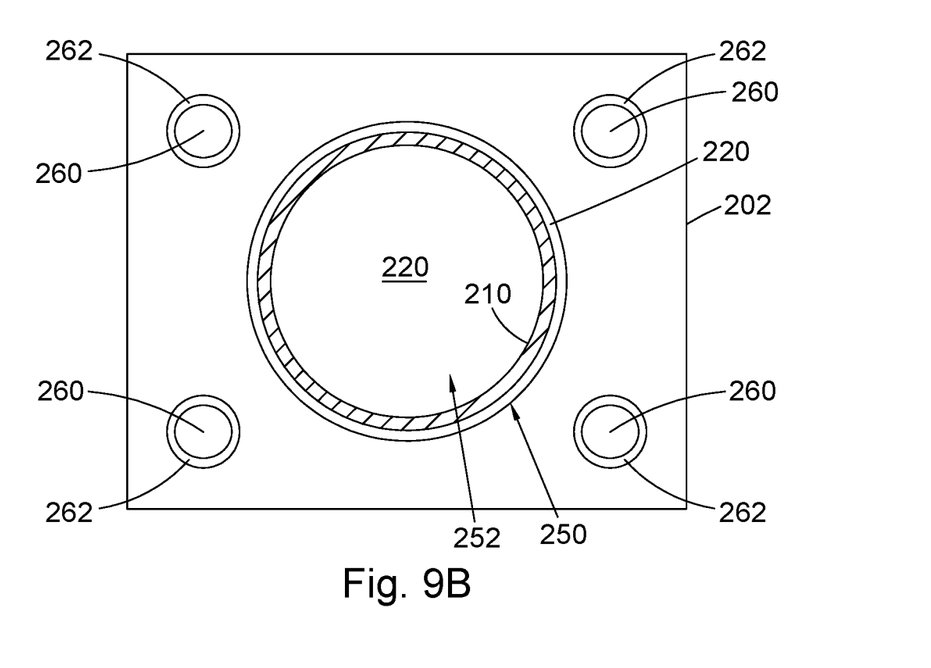
FIG. 9B is a top view of a slice through A-A in FIG. 9A.

In the example of FIGS. 8A-8B, a very thin (e.g., submicron) layer of replication material 124 still may remain between the free-end of the spacer 210 and the opposing surface of the UV curable shield 202. To achieve even greater uniformity in the thickness of the base layer of the replicated optical elements, in some instances, as shown in FIGS. 9A and 9B, additional openings 262 can be formed in the UV curable shield 202. The openings 262 are disposed laterally around the perimeter of the opening 250 that accommodates the area 252 for the replicated optical element and for the spacer 210 of the tool 201B. Each of the openings 262 can be shaped and sized, for example, so that a respective spacer 260 of the tool 201B can rest directly on the surface of the transparent substrate 220. In this implementation, the spacers 260 are outside the area where the replicated optical element is formed. When the tool 201B is brought into contact with the transparent substrate 220, the spacers 260 are in direct contact with the surface of the transparent substrate and thus define the base layer thickness for the optical elements. In this process, the any excess replication material 124 flows outside and over the UV curable shield 202. As the shield 202 subsequently is removed, it is unnecessary to control the volume of replication material very precisely. Once the replication material 124, 124A is UV-cured and the shield 202 is released, removal of the shield 202 induces stress in thin regions around the replicated optical element, causing the excess replication material to be break off for removal.

The foregoing techniques can be performed, for example, at the wafer-level. The sub-assembly, including the transparent substrate having the replicated optical elements on its surface, then can be attached, for example, to another substrate (e.g., a printed circuit board) on which are mounted multiple light emitting devices (e.g., VCSELs, laser diodes, or LEDs). Each of the optical elements is aligned to an optical axis of a respective one of the light emitting devices. The stack of substrates then can be separated (e.g., by dicing) to form individual modules or packages each of which includes a light emitting device and an optical element. In this context, the substrate is "transparent" in the sense that it is substantially transparent to a wavelength of radiation (e.g., visible, infra-red (IR) or ultra-violet (UV)) emitted by the light emitting device.

In some implementations, the transparent substrate having the replicated optical elements on its surface is separated into individual units each of which includes a single one of the replicated optical elements (e.g., MLAs). The replicated optical elements then can be positioned (e.g., by pick-and-place equipment), for example, over a light emitter such as a VCSEL, an LED or laser diode as part of an optoelectronic package.

In some instances, a sub-assembly, including the transparent substrate having the replicated optical elements on its surface, is attached, for example, to another substrate (e.g., a printed circuit board) on which are mounted multiple light (e.g., visible, IR or UV) sensors. In this context, the substrate is "transparent" in the sense that it is substantially transparent to a wavelength of radiation (e.g., visible, infra-red (IR) or ultra-violet (UV)) detectable by the light sensor.

Other implementations are within the scope of the claims.

The invention claimed is:

1. A method for replicating optical elements, the method comprising:
   providing a transparent substrate having a structured UV curable shield adhering to its surface, the UV curable shield having openings that expose portions of the surface of the transparent substrate;
   replicating optical elements onto the exposed portions of the surface of the transparent substrate using a replication tool having a replication material on respective replication surfaces corresponding to optical elements, wherein the replication tool further includes spacers each of which laterally surrounds a respective one of the replication surfaces, and wherein, during the replicating, a free-end of each spacer is brought into close proximity to an opposing surface of the UV curable shield;
   applying UV radiation to the replication material and to the UV curable shield to cure the replication material and the UV curable shield; and
   subsequently removing the shield from the transparent substrate.

2. The method of claim 1 wherein the UV curable shield is composed of comprises a dicing tape.

3. The method of claim 1 wherein during the replicating, excess replication material flows onto the UV curable shield, and wherein removing the shield also removes the excess replication material.

4. The method of claim 1 wherein during the replicating, the free-ends of at least some of the spacers are brought into contact with the opposing surface of the UV curable shield.

5. The method of claim 1 wherein during the replicating, when the free-ends of the spacers are brought into close proximity to the opposing surface of the UV curable shield, a sub-micron thick layer of the replication material is present between at least some of the free-ends of the spacers and the opposing surface of the UV curable shield.

6. The method of claim 1 wherein the transparent substrate comprises glass.

7. A method fort replicating optical elements, the method comprising:
   providing a transparent substrate having a structured UV curable shield adhering to its surface, the UV curable shield having openings that expose portions of the surface of the transparent substrate;
   replicating optical elements onto the exposed portions of the surface of the transparent substrate using a replication tool having a replication material on respective replication surfaces corresponding to optical elements, wherein the replication tool further includes spacers each of which laterally surrounds a respective one of the replication surfaces, and wherein, during the replicating, a free-end of each spacer is brought into close proximity to a respective one of the exposed portions of the surface of the transparent substrate;
   applying UV radiation to the replication material and to the UV curable shield to cure the replication material and the UV curable shield; and
   subsequently removing the shield from the transparent substrate.

8. The method of claim 7 wherein the UV curable shield is composed of comprises a dicing tape.

9. The method of claim 7 wherein during the replicating, excess replication material flows onto the UV curable shield, and wherein removing the shield also removes the excess replication material.

10. The method of claim 7 wherein during the replicating, the free-ends of at least some of the spacers are brought into contact with the respective one of the exposed portions of the transparent substrate.

11. The method of claim 7 wherein during the replicating, when the free-ends of the spacers are brought into close proximity to a respective one of the exposed portions of the transparent substrate, a sub-micron thick layer of the replication material is present between at least some of the free-ends of the spacers and the respective one of the exposed portions of the transparent substrate.

12. The method of claim 7 wherein the transparent substrate comprises glass.

13. A method for replicating optical elements, the method comprising:
   providing a transparent substrate having a structured UV curable shield adhering to its surface, the UV curable shield having first and second openings that expose portions of the surface of the transparent substrate, wherein respective groups of the second openings laterally encircle respective ones of the first openings;
   replicating optical elements onto the exposed portions of the surface of the transparent substrate defined by the first openings, wherein the replicating is performed using a replication tool having a replication material on respective replication surfaces corresponding to optical elements, wherein the replication tool further includes a plurality of spacers, wherein respective groups of the spacers laterally encircle respective ones of the replication surfaces, and wherein, during the replicating, a free-end of each spacer is brought into contact with a respective one of the exposed portions of the surface of the transparent substrate defined by the second openings;

applying UV radiation to the replication material and to the UV curable shield to cure the replication material and the UV curable shield; and subsequently removing the shield from the transparent substrate.

14. The method of claim 13 wherein the UV curable shield comprises a dicing tape.

15. The method of claim 13 wherein during the replicating, excess replication material flows onto the UV curable shield, and wherein removing the shield also removes the excess replication material.

16. The method of claim 13 wherein the transparent substrate comprises glass.

* * * * *